United States Patent [19]

Hepler et al.

[11] Patent Number: 5,334,006
[45] Date of Patent: Aug. 2, 1994

[54] HOT SPRUE BUSHING WITH INTERCHANGEABLE TIP HAVING MULTIPLE EDGE GATES

[75] Inventors: Douglas C. Hepler, Rochester; David L. Pursel, Webster, both of N.Y.

[73] Assignee: Polyshot Corporation, Henrietta, N.Y.

[21] Appl. No.: 993,654

[22] Filed: Dec. 21, 1992

Related U.S. Application Data

[63] Continuation-in-part of Ser. No. 853,953, Mar. 19, 1992, Pat. No. 5,213,824, which is a continuation of Ser. No. 590,932, Oct. 1, 1990, abandoned.

[51] Int. Cl.$^5$ .............................................. B29C 45/20
[52] U.S. Cl. ........................... 425/190; 264/328.15; 425/549; 425/567; 425/572
[58] Field of Search .............. 425/190, 191, 192 R, 425/549, 570, 572, 567; 264/328.14, 328.15

[56] References Cited

U.S. PATENT DOCUMENTS

| 4,034,952 | 7/1977 | Stewart | 425/572 |
|---|---|---|---|
| 4,266,723 | 5/1981 | Osuna-Diaz | 425/549 |
| 4,273,525 | 6/1981 | Reitan | 425/549 |
| 4,304,544 | 12/1981 | Crandell | 425/549 |
| 4,309,163 | 1/1982 | Cottancin | 425/549 |
| 4,345,892 | 8/1982 | Schulte et al. | 425/572 |
| 4,563,149 | 1/1986 | Landis | 425/549 |
| 4,593,182 | 6/1986 | Schwarzkopf | 435/549 |
| 4,666,396 | 5/1987 | Shaw | 425/549 |
| 4,787,836 | 11/1988 | Osuna-Diaz et al. | 425/190 |
| 4,882,469 | 11/1989 | Trakas | 425/549 |
| 4,981,431 | 1/1991 | Schmidt | 425/549 |
| 5,028,227 | 7/1991 | Gellert et al. | 425/190 |
| 5,123,834 | 6/1992 | Joyner | 425/592 |
| 5,127,814 | 7/1992 | Johnson et al. | 425/130 |

Primary Examiner—Tim Heitbrink
Attorney, Agent, or Firm—Francis J. Caufield

[57] ABSTRACT

A highly reliable hot sprue bushing with an interchangeable tip having multiple edge gates for use in controlling the temperature of plasticized material while it flows from the injection nozzle to the gates of a multiple cavity mold. Advantageously, the hot sprue bushing is adjustable in length so that it can be used with a full range of standard or custom mold plate thicknesses or other required lengths and the interchangeable tip does not require separate heating and temperature control.

15 Claims, 5 Drawing Sheets

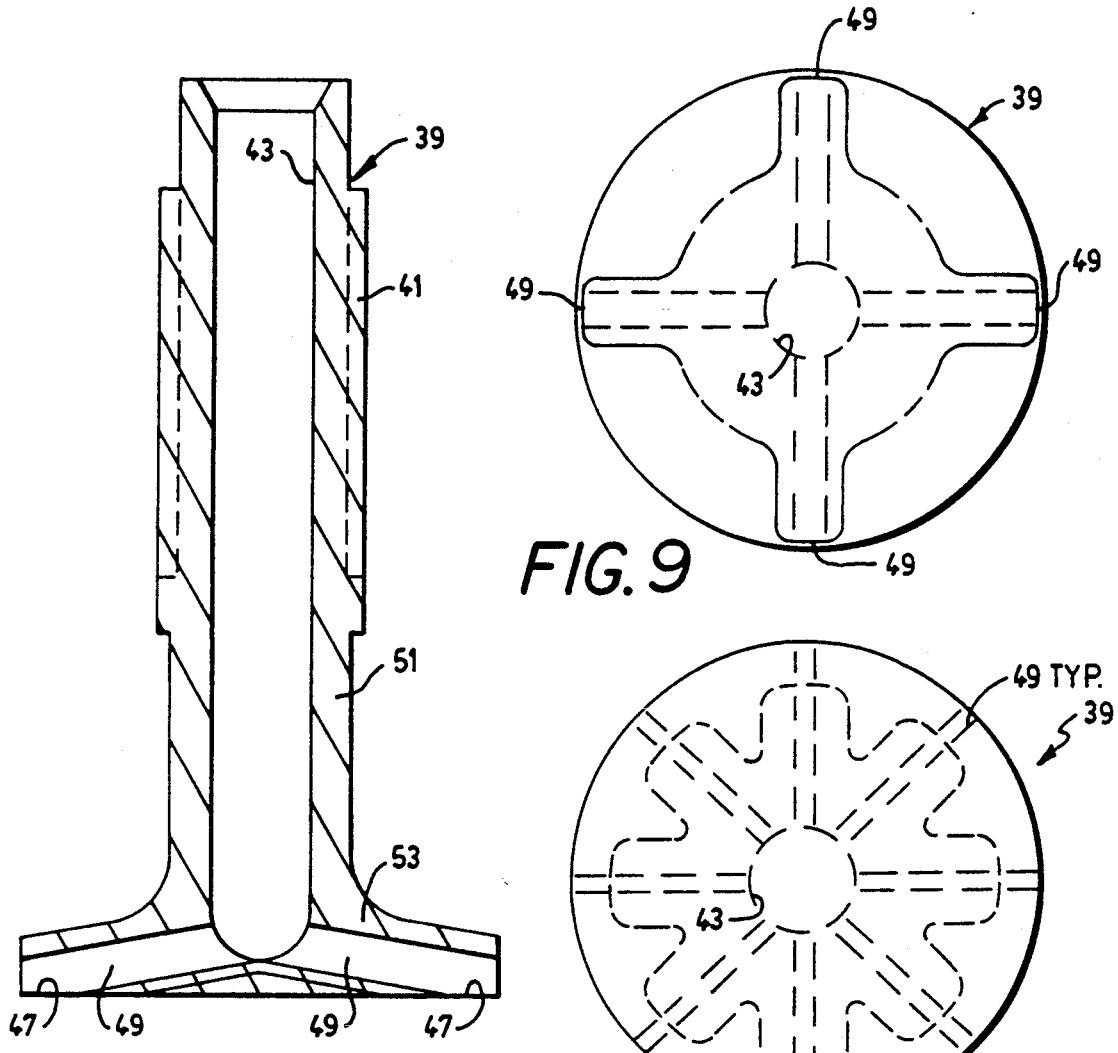
FIG. 9
FIG. 8
FIG. 10
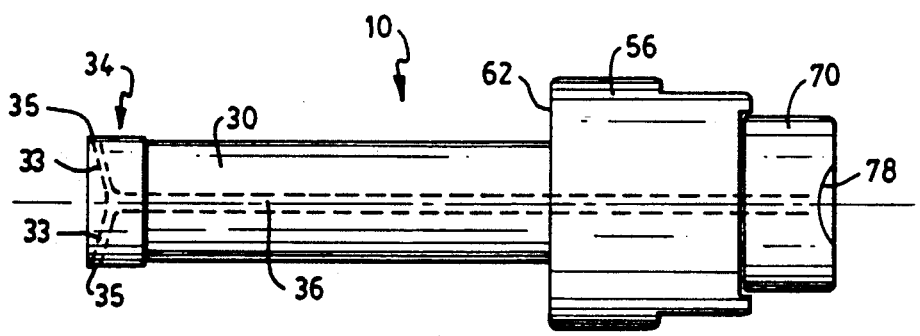
FIG. 11

HOT SPRUE BUSHING WITH INTERCHANGEABLE TIP HAVING MULTIPLE EDGE GATES

CROSS-REFERENCE TO RELATED APPLICATION

This application is a continuation-in-part of copending U.S. patent application Ser. No. 07/853,953 filed on Mar. 19, 1992 now U.S. Pat. No. 5,213,824 which, in turn, is a continuation of U.S. patent application Ser. No. 07/590,932 filed on Oct. 1, 1990 and now abandoned.

BACKGROUND OF THE INVENTION

1. Field of the Invention

This invention in general relates to the field of injection molding and in particular to adjustable hot sprue bushings with interchangeable tips having multiple edge gates for conveying melted plastic from the injection nozzle to mold cavities.

2. Description of the Prior Art

In plastic injection molding processes, a thermoplastic or thermoset molding material is first controllably heated to plasticity in an injection cylinder. Afterwards, the plasticized compound is forced from the cylinder through a nozzle under the influence of pressure generated within the cylinder. On emerging from the nozzle, the plasticized material is conveyed through a hole in a mold plate, usually stationary, by means of a sprue bushing, or sprue for short. Then, the plasticized material directly enters one or more cavities via gates or enters a runner system prior to passing through a cavity gate. Once in the cavity, the material assumes the shape of the cavity and is cooled to a point where it is sufficiently solidified thereby acquiring the desired part shape. The mold is then opened, and the part is ejected or otherwise removed. The entire process is usually automated, with clamping of the mold parts prior to injection, unclamping for part ejection, and removal after cooling, taking place under the control of a microprocessor or other form of automated controller.

In the industry, molding machines are rated by the number of ounces they will inject per piston or screw stroke and/or by the working area that can be clamped against injection pressure. Therefore, the rating sets a particular machine's capacity which can be utilized to fabricate a variety of different sized parts limited only by the maximum rating. This is accomplished by using, among other things, plates which couple cavities with the injection machine. These plates function to retain and position cavities, contain the plastic feed system, and house the temperature control system. To perform these functions, the plates need to be of suitable thickness for the particular requirements of the part to be molded along with consideration for all supporting systems. Obviously, parts with large working areas, molded at high injection pressures, call for robust mold plates to sustain the relatively larger stresses created during their molding cycle. Plates used to make small parts, on the other hand, can be scaled down in size in accordance with the reduced stresses generated while molding them. Parts between the largest and smallest obviously require intermediate sized plates. Because of the need for plates of different thickness to fully exploit machine capacity, the industry has adopted standardized plate thicknesses. These standard mold plates are also available in a variety of lengths to meet the majority of mold requirements and so offer many advantages to those in the industry. These include quick delivery, cost savings over custom construction and high-quality. Additionally, the use of standardized plate thicknesses reduces design time and allow for the predetermined design and supply of other standard components such as leader pins, return pins, locating rings, and sprue bushings.

In this connection, standard length sprue bushings thus have been made available to accommodate standard mold plate thicknesses. These sprue bushings are available in cold and heated configurations. However, for best process performance regardless of part size, it is known to be beneficial to control the temperature of the plasticized compound more or less constant throughout its travel to the cavity. This reduces process problems associated with material degradation due to thermal variability, improves yield by decreasing scrap losses, and increases machine production time by reducing down time due to freeze offs. Even so, present molding machinery does not always provide for precise temperature control to take advantage of its beneficial effects. Indeed, much of the available machinery is still run employing cold sprue bushings which allow the temperature of the resin to be poorly controlled from the time it leaves the nozzle until it reaches a zone in the mold where temperature control is reacquired with, for example, internal heating channels in the mold. More sophisticated practice, apparently not yet universally accepted, does, however, recognize the advantages of controlling temperature by employing hot sprue bushings to convey material from the nozzle to the cavity gate often times through the fixed mold plate, sometimes referred to as the "A" plate, or base.

A variety of approaches for providing heat in these hot sprue bushings have been used. Among these are the use of resistive heating elements and heat pipes such as those described in U.S. Pat. No. 4,034,952 entitled "HOT PLASTIC INJECTION BUSHING" issued on Jul. 12, 1977. In the latter case, the heat pipes are used to transfer heat from electrically powered heater bands located at the nozzle end of the sprue bushing to regions along the bore near the tip.

The known commercially available hot sprue bushings, however, have a number of disadvantages in that molding shops need to acquire a variety of different sizes to match the range of standard "A" plate dimensions adopted by the industry for use in fabricating parts of different scale, and it is expensive and time consuming to customize them. In addition, their reliability is impaired because of failures associated with tip breakage and heating performance.

Consequently, it is a primary object of this invention to provide a highly reliable hot sprue bushing that can easily be adapted for use with the full range of molding plate thicknesses or easily customized to meet the needs of specific jobs where there is not an exact match between off-the-shelf bushings and standard plate thicknesses.

In addition, to the foregoing object of the invention, it is another object to provide a heated sprue bushing having an interchangeable tip provided with a plurality of edge gates.

As is well-known, a gate is the connection between the terminal end of the flow channel, whether the end of a runner or sprue, and the molded part cavity. As such, it must permit enough material to flow into the cavity to fill it out plus provide any additional material required to overcome normal thermal shrinkage. The location of the gate, its type and size strongly affect the molding process and the physical properties of the part.

Gates are classifiable by their size and location with respect to where they connect with the part cavity, or cavities in cases where the mold is a multicavity type for producing a plurality of parts during each molding cycle. Thus, gates are either large or restricted based on size, and center, ring, or edge based on location. With restricted edge gates, the plasticized material is forced into the cavity through a small orifice where it picks up velocity and, as a result, becomes less viscous, allowing it to successfully fill the mold cavity. When the cavity is cooled, the flow ceases, the plastic in the gate quickly solidifies, and the part may be separated from delivery system. For the next cycle, the solidified plastic in the gate, now "frozen", must again be brought up to the temperature where it will again be in a plasticized state capable of flowing for the next cycle. To assure that this happens, those in the art have provided a variety of more or less complicated heated edge gate systems. Consequently, there is a need for a simplified edge gate system capable of being used in multicavity applications and not needing direct heating or complicated mold designs to achieve this. It is, therefore, an additional object of the present invention to satisfy this need.

It is another object of this invention to provide a hot sprue bushing for uniformly controlling the temperature of plasticized material while it travels from the nozzle to the edges of mold cavity(ies).

Other objects of the invention will in part be obvious and will in part appear hereinafter. A full understanding of the invention will best be had from reading the detailed description to follow in connection with the detailed drawings.

SUMMARY OF THE INVENTION

This invention relates generally to injection molding machinery and particularly to a highly reliable hot sprue bushing, adjustable in drop length, and having an interchangeable tip with multiple edge gates for controlling the temperature of plasticized material as it is conveyed through the stationary plate or plates of a mold from the nozzle to the cavity gate(s). The bushing in preferred form comprises a one-piece body of corrosion-resistant steel hardened to provide enhanced wear characteristics. Through a portion of the length of the body is an elongated bore that serves as at least a portion of the flow channel. The tip releasably screws into the terminal end of the body, substantially surrounded by it, to couple to the elongated bore and provide a plurality of edge gates which can couple with a like number of cavities for the purpose of conveying plasticized material to them. The tip is partially thermally coupled with the body and partially thermally insulated from it and nearby mold parts. Surrounding the through bore are a plurality of equally spaced electrically heating cartridges for heating the length of the body and tip under controlled temperature conditions. Temperature is monitored by a single thermocouple located near the bushing end and proximate the tip. Feedback controls temperature from information supplied by the single thermocouple. In this connection, the body is made of a relatively high heat capacity material relative to the tip and also has a lower coefficient of thermal conductivity relative to the tip. As such, the body acts as a relatively large heat source of constant temperature with respect to tip to provide the tip with all of the heat that it needs to maintain it, especially those parts of it outside of the body and near the edge gate, at the temperature needed to assure that material is plasticized as required.

The body has a threaded head near the nozzle end for receiving a series of spacing sleeves or collars adapted to permit adjustment of the effective bushing length to match either standard mold plate thicknesses or custom length requirements.

A removable cap, preferably fabricated of high heat conductivity material, mates with the body head to assure temperature control of nearby regions not directly heated by the cartridges. Additionally, the cap, which is preferably fabricated of beryllium copper, provides the interface with the nozzle. For this purpose it has a recess whose geometry is shaped to complement that of standard nozzles.

At the nozzle end over the cap is a stainless steel bracket for holding and positioning wiring to ease handling and keep wiring clear of other molding equipment and free from plastic "drool" from the nozzle.

DESCRIPTION OF THE DRAWINGS

The structure and operation of the invention together with other objects and advantages thereof may best be understood by reading the detailed description in connection with the drawings wherein signle reference numerals have been used throughout to designate the same part and wherein:

FIG. 8 is an enlarged cross-sectional elevational view of the interchangeable edge gate tip of the invention;

FIG. 9 is an enlarged end view of the bottom of one possible gate embodiment for the interchangeable edge gate tip of the invention;

FIG. 10 is similar to FIG. 9 and illustrates yet another possible edge gate embodiment for the interchangeable edge gate tip of the invention; and FIG. 11 is similar to FIG. 1 except illustrating a different spacing collar for lengthening the drop length of the inventive bushing.

DETAILED DESCRIPTION

Figure 1:
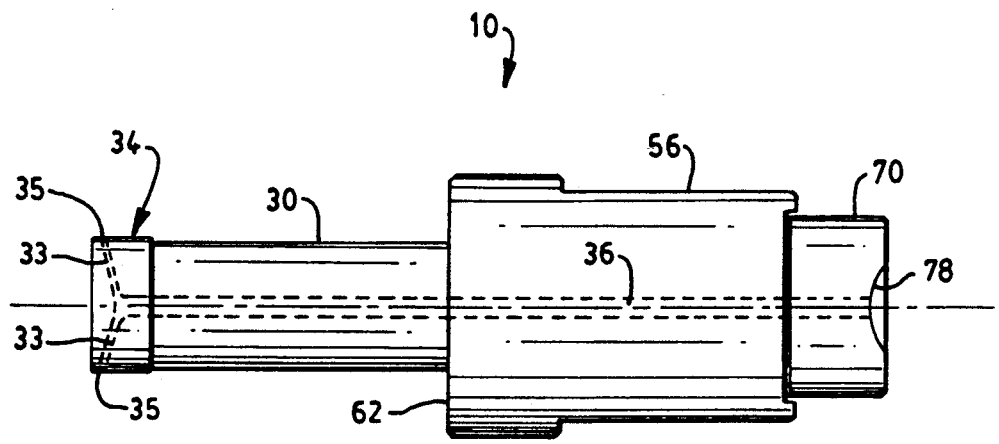
FIG. 1 is a diagrammatic side view of the bushing of the invention with features shown hidden.

Referring now to FIG. 1, the inventive hot sprue bushing is designated generally at 10 where it is seen to comprise a body 30, a spacing sleeve 56, and a head cap 70. Bushing 10 has a terminal end or tip designated generally at 34, which is closest to the mold cavity when in operation. Extending through bushing 10 is a central flow channel or bore 36 which feeds plastic from the injection machine nozzle to a plurality of branch channels 33 terminating in exit ports 35 (only two shown). The exit ports 35 at least in part define edge gates to a plurality of mold cavities.

Figure 2:
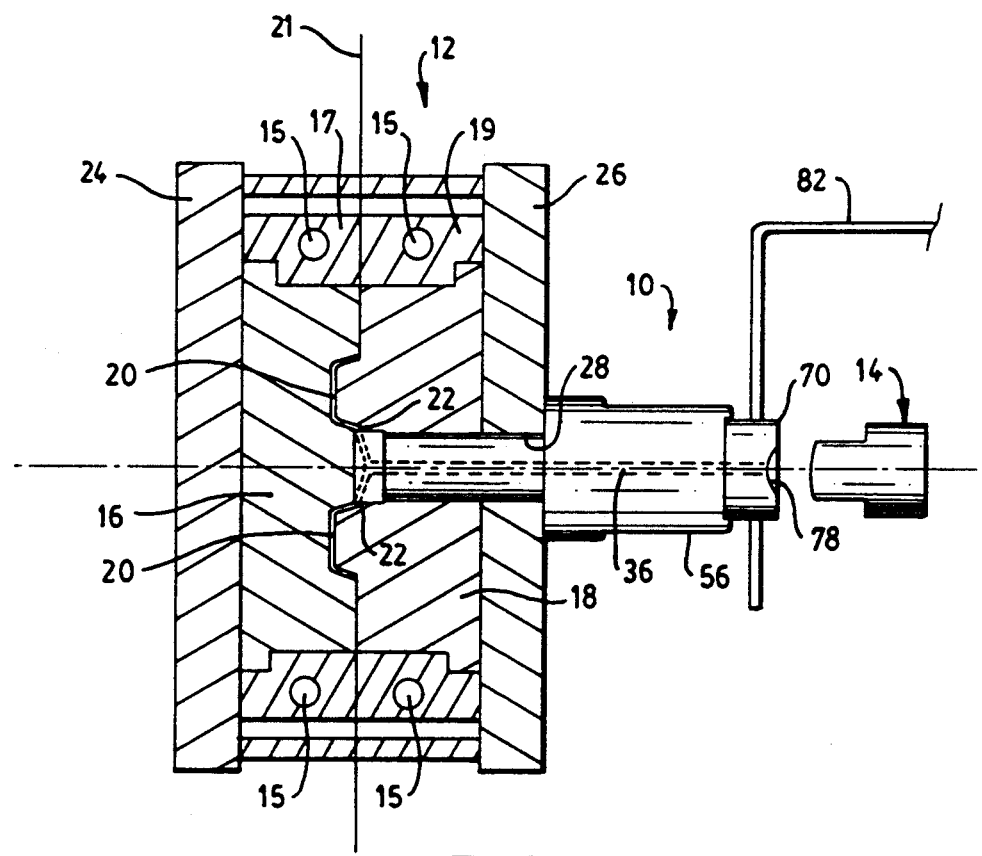
FIG. 2 is a diagrammatic sectional elevational view of the invention shown in conjunction with the principal parts of an edge gated multicavity injection mold.

In FIG. 2, bushing 10 is shown in operative relationship with a simple edge-gated injection mold 12. A diagrammatically illustrated nozzle 14 from the front end of, for example, a reciprocating screw injection cylinder (not shown) in which either thermoplastic or thermoset materials are plasticized for travel through the orifice of nozzle 14 couples with the bushing 10.

Mold 12 comprises a force block 16 and cavity block 18 which between them form a plurality of cavities 20 (only two shown) in the shape of the part to be molded. Cavities 20 are edge gated to bushing 10 by way of restricted flow paths in the form of small orifices or cavity gates designated at 22.

Force block 16 is fixedly mounted to a back-up mold mounting plate 24 via a retainer plate 17, and cavity block 18 is mounted to a cavity retainer or stationary plate 26 via a retainer plate 19. During the injection molding process, plates 24 and 26 are physically held in place against one another by clamping as with, for example, well-known hydraulically powered clamping arrangements (not shown) and, in turn, retain the cavity defining halves of mold 12 against one another under the pressure of injection. Cooling of the cavities 20 is by way of lines shown generally at 15.

After cavities 20 are filled during the molding cycle, the plasticized material is solidified by cooling, and plate 24 is moved to break the mold at a parting line 21. When this happens, the part may be either removed, ejected, or sheared away from cavity block 18 in any well-known manner. Plate 26 usually remains stationary during this process and, hence, is referred to as a stationary plate. It is also called a top clamping plate and is one of those plates in common use that is available in a variety of standardized thicknesses and lengths to satisfy the need for the different loadings generated while injecting parts of different size and projected area, as well as to accommodate different requirements related, for example, to mold component sizes and internal temperature control systems.

Connecting the cavity gates 22 and the orifice of nozzle 14 is the inventive hot sprue bushing 10 which, among other things, can be adjusted in the manner to be described for use with either standard stationary plate thickness, stationary plates of custom thickness, or other custom lengths while also controlling temperature of the plasticized material traveling through it. In this connection, hot sprue bushing 10 fits through a hole 28 provided in stationary plate 26 for this purpose. Bushing 10 is located with a standard ring which is also not shown but whose use is well-known and customary in the industry.

Figure 3:
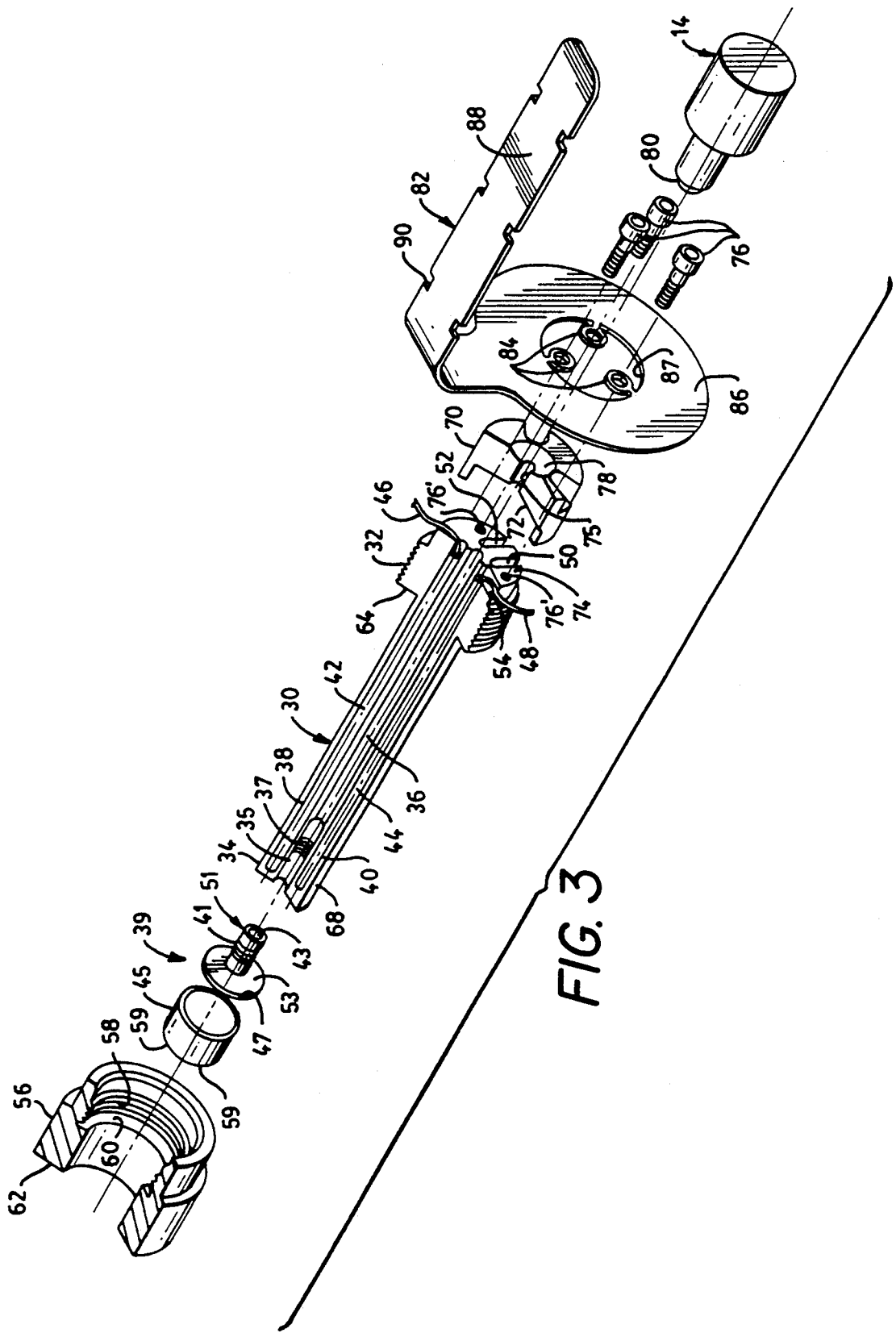
FIG. 3 is an exploded perspective of the hot sprue bushing of the invention shown with parts broken away and an optional interface cap along with a fragment of a nozzle.

Referring now to FIG. 3, the body 30 of hot sprue bushing 10 is preferably made of a single piece of corrosion resistant steel that is preferably hardened to the same level as that of stationary plates and mold halves to enhance its wearing characteristics and improve reliability of operation.

At the nozzle end of body 30 is a threaded, enlarged head 32 while opposite it, near the mold end, is the tip 34 as previously mentioned. Extending the length of body 30 is an elongated through bore 36 that may be slightly tapered outwardly over part of its length. At the end of bore 36, near tip 34, there is a counterbore section 35 that is partially threaded over a predetermined length. The threaded portion of counterbore section 35 is designated 37.

Figure 4:
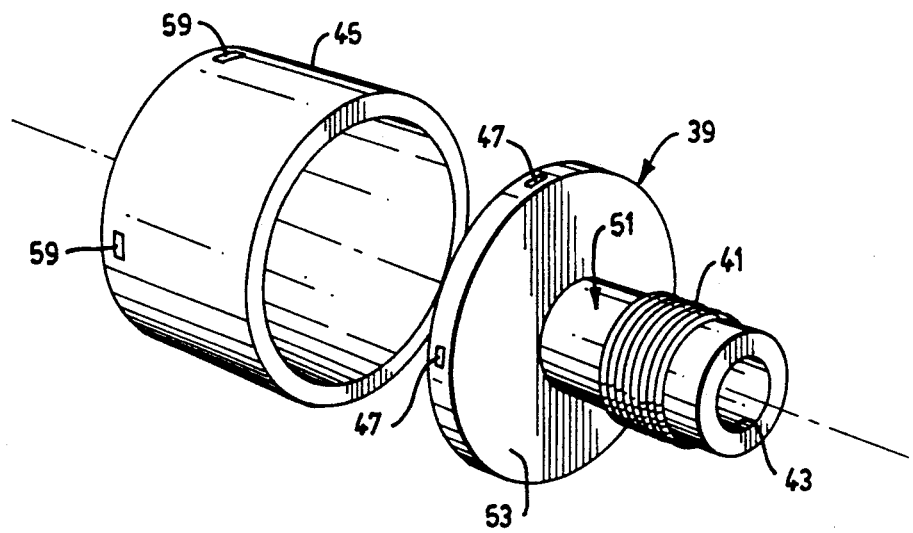
FIG. 4 is a an enlarged exploded perspective of the edge gate tip of the invention as shown in FIG. 3 along with the optional interface cap.
Figure 5:
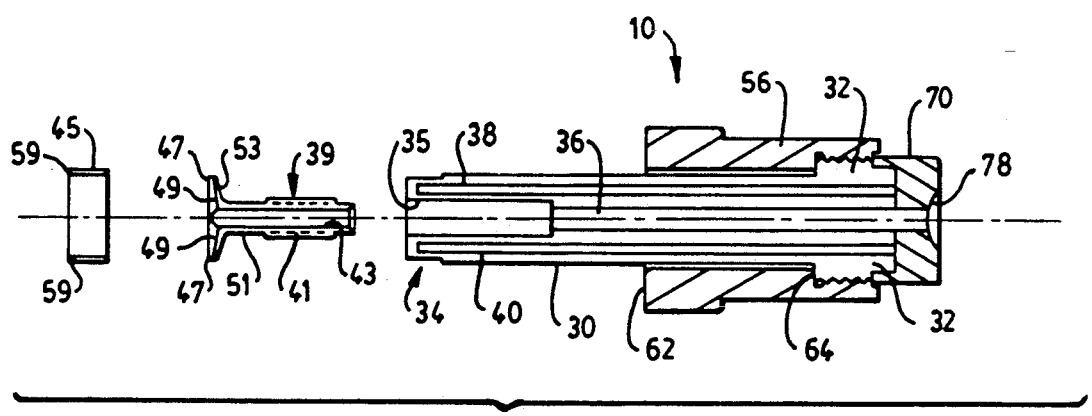
FIG. 5 is an exploded sectional view of the invention with the section taken generally through line 5—5 in FIG. 1.
Figure 6:
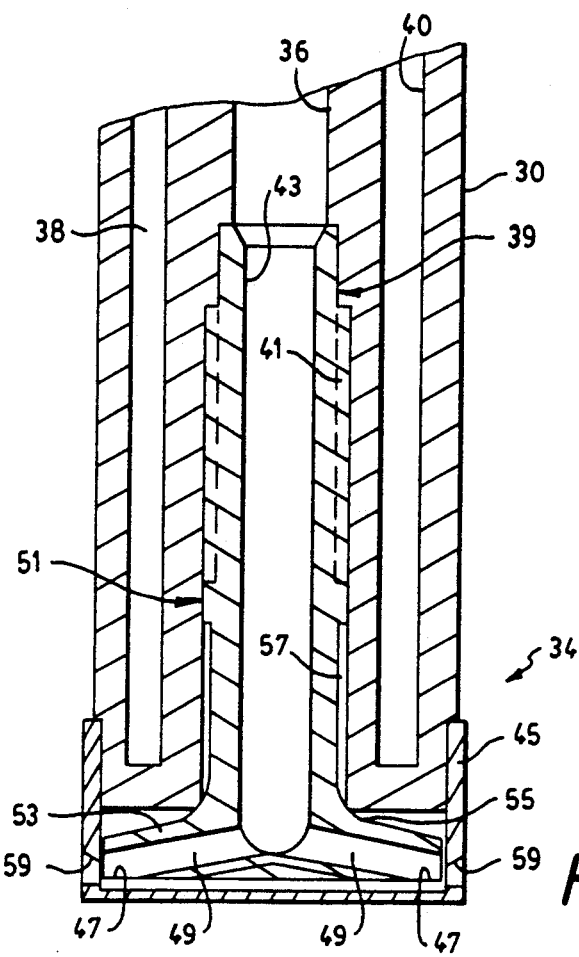
FIG. 6 is an enlarged sectional view of a portion of the invention shown in FIG. 1 and is also taken generally along line 5—5 of FIG. 1.

A multiported, interchangeable tip 39 is provided to releasably thread into counterbored section 35 of body 30 so that the majority of its bulk physically resides within body 30 with their respective complementary configured threads in intimate engagement yet otherwise thermally insulated from it and nearby mold parts in a manner to be described. As best seen in FIG. 4, tip 39 comprises a neck 51 and pedestal 53. In neck 51 is a bore 43 that is adapted to communicate with bore 36 of body 30, forming a continuation of it beyond the point where its counterbore section 35 begins. Bore 43, therefore is a continuum of bore 35, substantially of the same diameter for a given length, and then splits into a plurality of equally sized, and smaller branch channels 49 (see FIG. 7) each of which terminate in a respective exit port or orifice 47 (FIG. 4) of pedestal 53.

The neck of tip 39 is provided with threads 41 that complement threads 37 in counterbore 35. When tip 39 is located in counterbore section 35, pedestal 39 extends outside of body 30 as shown. The diameter of neck 51, just below threads 41 and the upper regions of pedestal 53, near flared sections 55, are dimensioned so that tip 39 is mated with body 30 with only their complementary threads in contact with one another. Their remaining portions are thermally isolated from one another by way of a gap 57 that may be filled with air or plasticized material.

Tip 39 is preferably formed of a material that has a relatively lower heat capacity than that of body 30 yet with a significantly higher coefficient of thermal conductivity, preferably by a factor of approximately five. Beryllium copper has been found to be such a material while hardened stainless such as A10, S7, or P20 has been found effective for body 30. As will be appreciated, heat transfer from body 30 to tip 39 occurs via their mating threads whose area of contact is much larger than if the threads were not present. So, threads 41 and 37 represent not only a means of releasably attaching tip 39 to body 30 so that it can be easily replaced for repair, maintenance, or configuration selection, but also a means for transferring heat from body 30 to tip 39.

In this manner, plasticized material emerging from nozzle 14 is conveyed through heated flow channels to cavities 20 via bore 36 in conjunction with tip 39.

Figure 7:
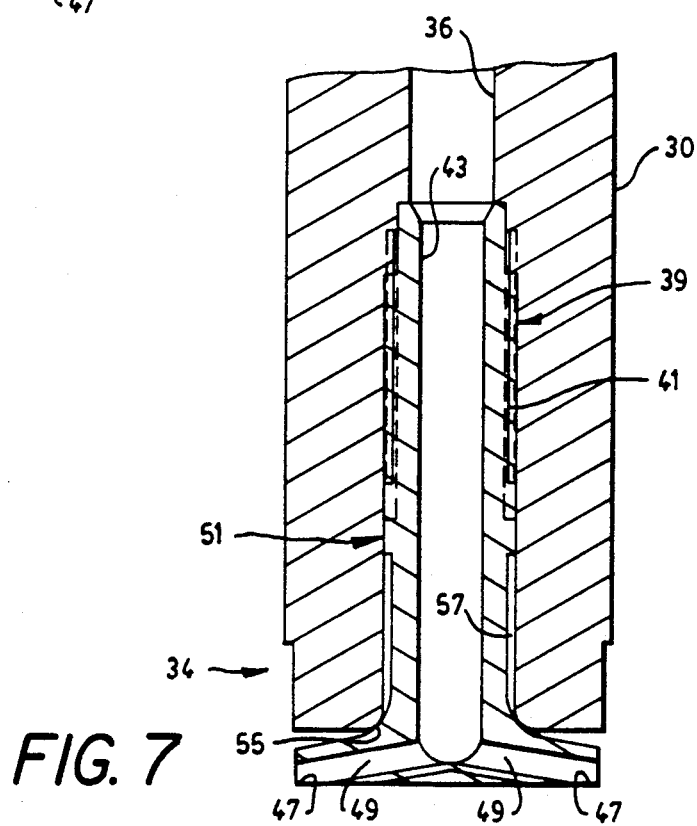
FIG. 7 is similar to FIG. 6 except that it does not shown the optional interface cap.

Tip 39 may optionally be surrounded by an interface cap 45 which is provided with diffusing ports 59 that are aligned with exit ports 47 of tip 39 (See FIGS. 4 and 7). While interface cap 45 is not required for operation of the invention, it has been found to provide a practical solution to mold interface problems in a relatively small percentage of applications.

Surrounding bore 36 are a plurality of equally spaced holes (one of which is shown at 38, see FIG. 3) arranged radially in equally spaced angular increments. For example, their may be four such nonthrough bores (38) all together, arranged at 90-degrees to one another. Bores 38 are dimensioned to extend substantially the length of central bore 36 to receive resistive heating cartridges such as that designated typically at 42. Heating cartridges 42 are placed so that, when powered, they preferably provide uniform heating of central bore 36 throughout its length to mitigate against adverse processing conditions related to uncontrolled temperature variations. While uniform temperature is desirable, those skilled in the art will recognize that there may be conditions for a controlled variation in temperature along the length of bore 36, and this may be provided by a nonuniform distribution of the heating coils of cartridges (42).

To monitor the temperature of bushing 10 at end tip 34 of body 30, a bore 40 is provided to receive a thermocouple 44 that resides preferably near body tip 34 as is practically possible. Located at tip 34, this position, which is nearest the cooling system of mold 12, is believed to be optimal for temperature sensing because this is the region of body 30 which is most likely to experience the highest heat loss and, therefore, should be the monitoring point to assure that all points forward of nozzle 14, especially tip 39, are sufficiently heated. Locating the temperature sensor at, for example, the nozzle end would assure that only it was at the desired temperature while allowing for the possibility of a cooler tip end, an undesirable situation.

In this manner, tip 34 is held at the desired temperature, even though at the highest probable point of heat loss, thus reducing the possibility for freeze-off, a condition in which plasticized material may unpredictably solidify upstream of the gate requiring machine down time to clear. With the tip 34 always at the desired temperature, freeze-off can be greatly reduced and with the aid of "suck back", the creation of a partial vacuum with the reciprocating plasticizing screw, it can, within limits, almost be eliminated.

The relative sizes or thermal masses of body 30 and tip 39 and the relative coefficients of thermal conductivity of the preferred materials from which they are fabricated are arranged so that body 30 acts as a virtually constant temperature source which is capable of transferring whatever heat is needed to maintain tip 39 at the predetermined temperature for plasticizing material. For this purpose, power requirements for the heating cartridges 42 may be determined in any well-known manner using, for example, finite element analytical techniques, empirical approaches, or a combination of the two, employing as well, thermocouple or optical measurements to asses temperature distribution and heat transfer. As an example, body 30 with an overall length of about 6 inches and a diameter of about ¾ of an inch, has been successfully operated using the inventive bushing and tip arrangement.

And, with the restricted edge gates provided by tip 39, the plasticized material is forced into the cavities 20 through small openings where it picks up velocity and, as a result, becomes less viscous, thereby allowing it to successfully fill mold cavities 20. When cavities 20 are cooled, the flow ceases, but in an anticipated manner, and the plastic in the gates quickly solidifies. Then, the part may be separated from the delivery system. For the next cycle, the solidified plastic in the gate, now "frozen", is again brought up to the temperature where it will again be in a plasticized state capable of flowing for the next cycle because tip 39 will have been maintained at that temperature by the heat supplied to it from body 30, even though not directly heated by separate heating cartridges apart from those designated at 42.

As best shown in FIGS. 9 and 10, tip 39 may have a variety of edge gate configurations, each of which has a plurality of equally spaced exit ports 49. FIG. 4 illustrates a four port configuration while FIG. 10 shows an eight port embodiment. In each configuration, it is important to take care to assure that each flow channel to each cavity experiences the same thermal environment to assure uniformity of heating and part filling.

Wires from heating cartridges 42, which are designated typically at 46 (FIG. 3), are led safely out of head 32 via relief slots, two of which are shown at 50 and 52, while the wire from thermocouple 44, shown at 48, is led from head 32 via a relief slot 54.

The "drop length" of bushing 10 or, more particularly, the distance from the nozzle side surface of stationary plate 26 to the front surface of tip 39, where it communicates with cavities 20 can be adjusted to the needs of a particular molding job through the use of threaded sleeves or collars such as that designated at 56. These sleeves 56 are made to different standard lengths and are provided with a threaded hole 58 to engage complementary threads on head 32. However, they can also easily be provided inexpensively in custom lengths to match the particular needs of any molding task. When screwed to head 32, a reference surface 60 of sleeves 56 butts against a reference surface 64 in the bottom of threaded hole 58, snugly seating against it, to define the drop length.

Sleeves 56 are also preferably made of stainless steel and preferably come in standard lengths, ranging from a shortest of 0.810 inches to a longest of 4.299 inches but, obviously, could be made to any desired length if nonstandard lengths were required. The lengths of sleeves 56 are also set in a well-known manner to account for the thermal coefficient of expansion of the material from which they are fabricated and the expected temperature environment in which they are to be used.

Consequently, the use of a series of standardized "drop length" sleeves (56) with a single-piece body 30 provides users with a simple means for reducing bushing inventory and enhances reliability since there are no separate heating cartridges with which to contend. This interchangeability also solves the lead time problems formerly encountered while awaiting a bushing delivery not in inventory. Hence, part delivery time is greatly improved. As an example of a shorter sleeve 56, which results in a longer "drop length", reference may be had to FIG. 11.

To prevent heat conduction between the outer surfaces of body 30 and the inner surfaces of stationary plate hole 28, or the surfaces of the cavity block 18 extending from the front surface of plate 26 to cavity gate 22, the diameter of body 30 is made to provide insulation from neighboring mode plates. Thus structured, when bushing 10 is mounted in mold 12, air relief gaps 66 and 68 are formed. Gaps 66 and 68 will vary in length depending on the length of sleeve 56 in use but, in any event, form a gap of nonconducting air around substantially the entire length of body 30, insulating it from the possible heat loss to its otherwise intimate surroundings.

Near the nozzle end of body 30, a heat conducting cap 70 is provided for attachment to head 32. Cap 70 is preferably formed of a material of high heat conductivity.

The method for attaching cap 70 is via three cap screws 76 which enter corresponding holes 76' located in head 32. Cap 70 is provided with a well finished surface 72 which snugly seats against the rear surface of head 32 to create intimate contact with it for purposes of assuring high heat conduction between body 30 and cap 70 since cap 70 is not directly heated via separate heating means such as by electric heating cartridges 42.

In this manner, cap 70 assures that the short orifice through it, indicated at 75, is maintained at or near the same temperature as that of through bore 36 or at an acceptably high level.

A spherical recess 78 is provided in the rear end of cap 70 to mate with the front end of nozzle 14 designated as 80. Since cap 70 is easily removable, recess 78 can be provided in a number of different geometries to match those of available standard nozzle sizes and/or shapes.

A bracket 82, preferably of stainless, is provided for ease of handling and to hold and position wiring away from surrounding molding equipment. Bracket 82, which is made of thin sheet stock, has a circular section 86 provided with stamped out hole 87 having a series of tabs typically shown at 84, also provided with holes for cap screws 76. At ninety degrees to section 86 is a rearwardly extending arm 82 having a series of notches typically shown at 90 for the purpose of securing wiring. Bracket 82 bolts to head 32 via screws 76, and nozzle 14 gains access to recess 78 via hole 87 by means of wire ties or the like.

The foregoing inventive structure, in addition to its versatility, has been found highly reliable having been able to mold millions of parts without failure. Scrap losses also have been remarkably reduced especially in molding small parts where the material lost to freeze-offs can be significant compared with part volumes.

Those skilled in the art may make changes to the invention without departing from the scope of its teachings. Therefore, it is intended that the embodiments described above be considered as illustrative and not be construed in a limiting sense.

What I claim is:

1. A hot sprue bushing for transporting plasticized material from injection nozzles to the edges of mold cavities while controlling the temperature thereof, said hot sprue bushing comprising:

at least one heating cartridge;

an elongated body of given length having arranged in order along its length a head, a stem, and a tip end, said head having a reference seating surface which faces said tip end and a rear surface facing opposite said tip end, said elongated body having a through bore passing from end to end through said head, stem, and tip thereof for transporting plasticized material through at least a portion of said elongated body from said head toward said tip end thereof, said elongated body having at least one nonthrough bore extending alongside said through bore, in heat conducting relationship with respect thereto, and receiving said heating cartridge for controlling the temperature of plasticized material as it travels along said through bore, said nonthrough bore having a length which extends from said head rear surface, through said head and said stem and into said tip end by a predetermined distance, said length of said nonthrough bore being shorter than said given length of said elongated body, said through bore being counterbored a given depth near said tip end of said elongated body, said body being fabricated of a material with a predetermined heat capacity and coefficient of thermal conductivity to provide it with a predetermined mass and heat transfer capability; and a tip fitted into said counterbore of said elongated body so that part of said tip is in heat conducting relationship with respect to said elongated body while its remaining parts are thermally isolated therefrom, said tip being releasably mateable with said elongated body and having a flow bore which is adapted to communicate with said through bore of said elongated body to receive plasticized material from it, said tip including a plurality of branch flow channels that communicate with said flow bore thereof and terminate in openings for edge gating with a plurality of mold cavities, said tip being fabricated of a material that has a thermal mass less than that of said body material and a coefficient of thermal conductivity substantially higher than that of said elongated body material so that said elongated body acts as a constant temperature source with respect to said tip so as to transfer heat to said tip at said portion thereof in thermal contact therewith to heat said tip and maintain said tip at temperatures for plasticizing material without requiring heating apart from that supplied to said body by said heating cartridge.

2. The hot sprue bushing of claim 1 wherein said tip comprises a partially threaded stem and a pedestal wherein said stem includes said tip flow bore and said pedestal includes said branched flow paths of said tip.

3. The hot sprue bushing of claim 1 wherein said elongated body material comprises hardened stainless steel selected from the group consisting of A10, S7, or P20.

4. The hot sprue bushing of claim 3 wherein said tip material comprises beryllium copper.

5. The hot sprue bushing of claim 1 wherein said tip and said body each have complementary threaded portions so that said tip can easily be exchanged for another for purposes of repair, maintenance, and/or tip configuration changes.

6. The hot sprue bushing of claim 1 further comprising a cap adapted to fit over said tip and provide an intermediate interface between said tip and an injection mold.

7. The hot sprue bushing of claim 1 further including adjustment means manually positionable against said reference seating surface of said head, between said reference seating surface and said tip end for setting the drop length of said hot sprue bushing, said adjustment means being adapted to provide a mold plate seating surface selectively locatable over a predetermined range of distances between said reference seating surface and said tip to adjust the drop length of said hot sprue bushing, the drop length corresponding to the distance between said mold plate seating surface and said tip.

8. The hot sprue bushing of claim 7 wherein said adjustment means comprise a series of interchangeable spacing sleeves of different length for separate use with said elongated body.

9. The hot sprue bushing of claim 1 wherein said elongated body is fabricated of a single piece of material.

10. The hot sprue bushing of claim 9 wherein said single material is hardened steel.

11. The hot sprue bushing of claim 1 wherein said at least one nonthrough bore comprises four bores for receiving four heating cartridges, said four bores being equally spaced around said through bore of said elongated body.

12. The hot sprue bushing of claim 1 further comprising yet another bore adapted to receive and position a temperature sensor substantially at said tip of said elongated body for controlling the temperature of said through bore over its full given length.

13. The hot sprue bushing of claim 1 wherein said drop length corresponds to at least one selected from standard mold plate thicknesses.

14. The hot sprue bushing of claim 2 wherein said head of said elongated body and said spacing sleeves are adapted to releasably screw to one another.

15. The hot sprue bushing of claim 1 wherein said wherein said coefficients of heat conductivity of said tip and said elongated body materials differ by a factor of 5.

* * * * *